US012578192B2

(12) United States Patent
Albright et al.

(10) Patent No.: US 12,578,192 B2
(45) Date of Patent: Mar. 17, 2026

(54) RESETABLE MECHANICAL TILT SENSOR

(71) Applicant: NVIDIA Corporation, Santa Clara, CA (US)

(72) Inventors: Ryan Kelsey Albright, Beaverton, OR (US); William Andrew Mecham, Elk Grove, CA (US); William Ryan Weese, Portland, OR (US); Benjamin Joseph Goska, Portland, OR (US); Aaron Richard Carkin, Hillsboro, OR (US); Michael Scott Thompson, Wilsonville, OR (US)

(73) Assignee: NVIDIA Corporation, Santa Clara, CA (US)

( * ) Notice: Subject to any disclaimer, the term of this patent is extended or adjusted under 35 U.S.C. 154(b) by 901 days.

(21) Appl. No.: 17/839,001

(22) Filed: Jun. 13, 2022

(65) Prior Publication Data

US 2023/0400300 A1 Dec. 14, 2023

(51) Int. Cl.
*G01C 9/14* (2006.01)
*B65D 79/02* (2006.01)

(52) U.S. Cl.
CPC .............. *G01C 9/14* (2013.01); *B65D 79/02* (2013.01)

(58) Field of Classification Search
CPC ........ B65D 79/02; B65D 79/005; G01C 9/12; G01C 9/14
USPC .......................................................... 33/365
See application file for complete search history.

(56) References Cited

U.S. PATENT DOCUMENTS

| | | | | |
|---|---|---|---|---|
| 1,737,936 A | * | 12/1929 | Mercer | G01C 9/04 |
| | | | | 33/370 |
| 4,682,171 A | * | 7/1987 | Nakamura | G01C 23/005 |
| | | | | 340/975 |
| 4,989,334 A | * | 2/1991 | DuBose, Jr. | G01C 9/00 |
| | | | | D10/64 |
| 5,792,015 A | * | 8/1998 | Hoyt | G01C 9/12 |
| | | | | 33/391 |
| 5,825,665 A | * | 10/1998 | Swift | B62J 45/423 |
| | | | | 33/355 R |
| 5,884,407 A | * | 3/1999 | Braun | G01P 13/00 |
| | | | | 340/686.3 |
| 5,887,783 A | * | 3/1999 | Prokopis | B65D 79/02 |
| | | | | 229/199 |
| 6,367,408 B1 | * | 4/2002 | Gu | G01D 7/005 |
| | | | | 116/203 |

(Continued)

FOREIGN PATENT DOCUMENTS

| | | | | |
|---|---|---|---|---|
| CN | 211253662 U | * | 8/2020 | |
| JP | 2017012260 A | * | 1/2017 | |

*Primary Examiner* — John E Breene
*Assistant Examiner* — Daniel M Quinn
(74) *Attorney, Agent, or Firm* — Lowenstein Sandler LLP

(57) ABSTRACT

A tilt sensor includes a one-way rotational drive configured to translate rotational motion of an input shaft in a first rotational direction about a first axis of the input shaft and in a second rotational direction about the first axis into rotational movement in a first rotational direction about a second axis of an output shaft. The tilt sensor further includes a pendulum coupled to the input shaft. The pendulum is configured to rotate the input shaft in the first rotational direction or the second rotational direction responsive to a tilt motion of the tilt sensor. The tilt sensor further includes a motion meter coupled to the output shaft. The motion meter is configured to display a measure of total tilt motion of the tilt sensor.

24 Claims, 10 Drawing Sheets

(56)  References Cited

U.S. PATENT DOCUMENTS

| | | | |
|---|---|---|---|
| 6,459,483 B1 * | 10/2002 | Shafer | G01B 11/002 |
| | | | 356/3 |
| 2009/0054814 A1 * | 2/2009 | Schnapp | A61B 5/1116 |
| | | | 600/595 |
| 2010/0191408 A1 * | 7/2010 | Boylston | G01C 9/00 |
| | | | 701/31.4 |
| 2010/0218392 A1 * | 9/2010 | Lai | G01C 9/14 |
| | | | 33/391 |
| 2010/0312421 A1 * | 12/2010 | Eglin | B64C 27/04 |
| | | | 701/14 |
| 2020/0398980 A1 * | 12/2020 | Abdelli | B64C 27/56 |
| 2021/0156716 A1 * | 5/2021 | Demont | G01D 18/001 |

* cited by examiner

Tilt sensor 300

Housing 302

Pendulum 310

Maximum Tilt
Meter 303

Slide pin 312

Slide pin 314

Ratchet Channel 304

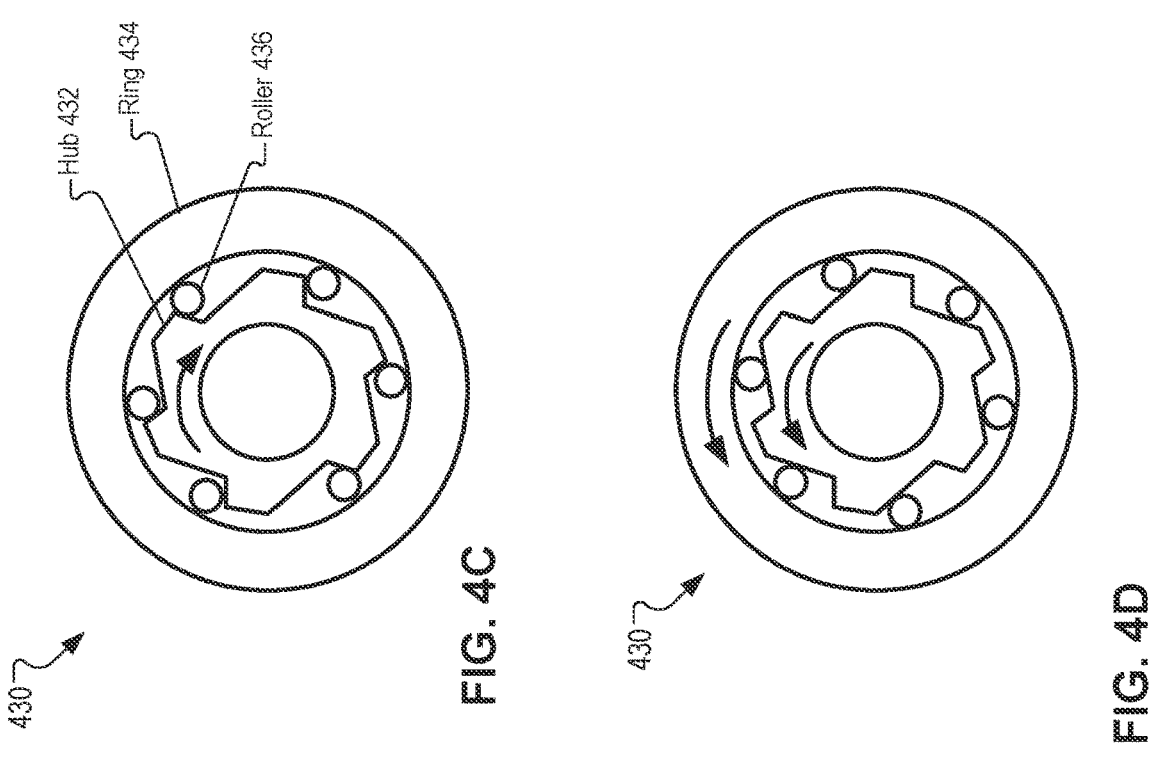
FIG. 4C
FIG. 4D
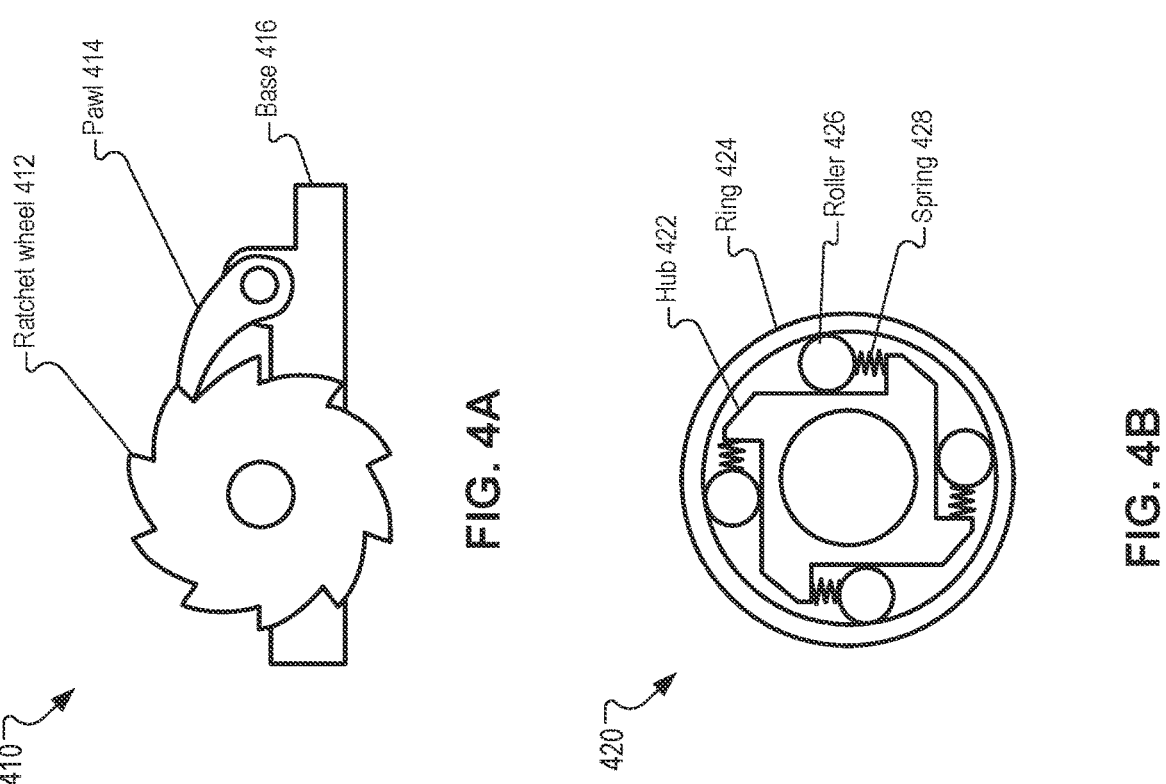
FIG. 4A
FIG. 4B

RESETABLE MECHANICAL TILT SENSOR

TECHNICAL FIELD

At least one embodiment pertains generally to tilt sensors, and more specifically, but not exclusively, to a resettable mechanical tilt sensor, such as for use in shipping packages.

BACKGROUND

Packages containing fragile materials sensitive to tilting are often shipped by various methods. For example, packages can be shipped by truck, by train, by ship, and/or by airplane. While in shipment, a package may be handled by various machines and/or handlers (e.g., human package handlers, machinery-based package handlers, etc.). The package may experience jostling and/or tipping which may affect products or materials inside the package. Additionally, the package and its materials may be stored for long periods before being received at a final destination. It may be beneficial for the receiver of the package to determine an amount of tilting the package and materials inside the package underwent during shipment.

BRIEF DESCRIPTION OF DRAWINGS

Various embodiments in accordance with the present disclosure will be described with reference to the drawings, in which:

FIGS. 4A-4D are schematic side views of one-way rotational motion controllers of a resettable mechanical tilt sensor, in accordance with at least some embodiments;

DETAILED DESCRIPTION

Figure 1:
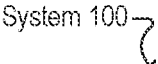
FIG. 1 is a perspective view of a package containing a resettable mechanical tilt sensor, in accordance with at least some embodiments.
Figure 1:
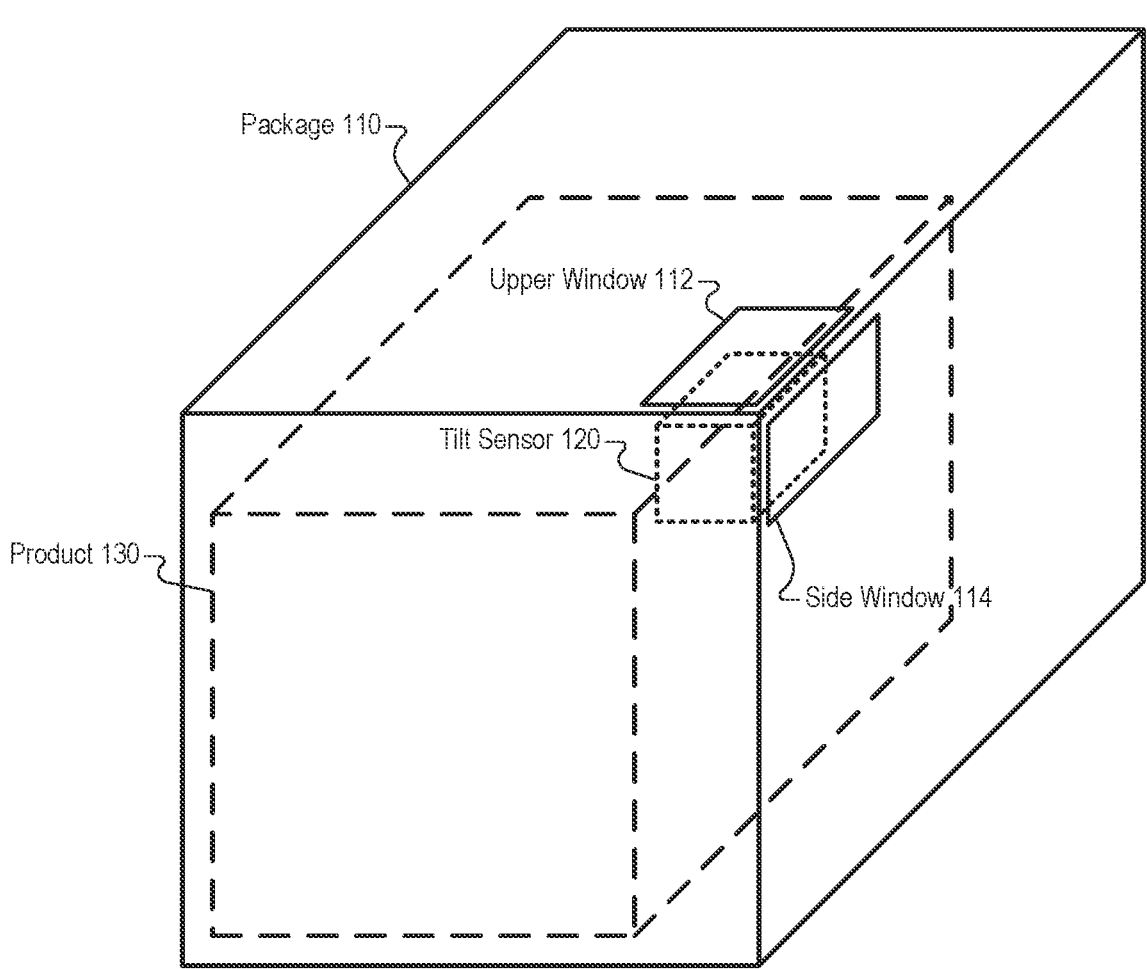

Embodiments described herein are related to a resettable mechanical tilt sensor, which may be used for shipping packages and/or for other purposes.

Tilt sensors can be used to measure a tilt angle of an object. For example, a tilt sensor can be coupled to a package to determine a tilt angle of the package. A tilt sensor may be a mechanical, electrical, and/or electro-mechanical sensor. Conventionally, a tilt sensor may indicate an instant tilt angle (i.e., a tilt angle currently sensed) and/or a maximum tilt angle achieved (e.g., over time).

Some conventional tilt sensors include one or more marbles within one or more plastic "bubbles." These tilt sensors may be stickers capable of being "stuck" onto an exterior of a package for viewing (e.g., by a technician, receiver, etc.). The plastic bubbles may include multiple pockets corresponding to tilt angles achieved by the package. When a specific tilt angle (e.g., 30°, 40°, 50°, etc.) of the package (and therefore of the tilt sensor) is achieved, a marble in the plastic bubble may roll into the next adjacent pocket. For example, when the marble is contained in the pocket corresponding to 30° and the package tilts to a 40° angle, the marble may roll into the pocket corresponding to 40° and be contained there until the package tilts to a 50° angle, at which point the marble may roll into the pocket corresponding to 50° and be contained there. The marble may not roll back into a pocket corresponding to a lower tilt angle. These conventional tilt sensors may only indicate a maximum tilt angle experienced by the package and a current tilt of the package. Although a maximum tilt angle may be important data, a total tilt (e.g., a total aggregate amount of tilt motion experienced by the package over a course of shipment) of the package may be helpful to a receiver (e.g., of the package) to determine how much tilting and/or jostling the materials or products within the package experienced during shipment. Conventional mechanical tilt sensors described here cannot track such total tilt motion.

The conventional tilt sensors described above may be prone to losing tilt angle data. Specifically, by nature of shortcomings of the design, the marbles may move from one pocket to another under harsh handling or jostling of the package, not from an increase in a tilt angle of the package. Additionally, when materials or products contained in the package are unpackaged, careless handlers (e.g., technicians, package receivers, etc.) may discard the tilt sensor, causing the marbles to move from the accurate pocket (e.g., the pocket corresponding to the highest tilt angle experienced by the package), therefore losing data previously indicated by the tilt sensor. If the tilt sensor is not discarded during unpackaging, a careless handler may still inadvertently mishandle the tilt sensor, again causing the marbles to move from the accurate pocket, therefore losing data previously indicated by the tilt sensor. This data that is lost may be useful should the materials or products be re-packaged and shipped to another destination.

Additionally, many tilt sensors cannot be reset. Conventional mechanical tilt sensors as described above cannot be reset and thus cannot be reused. For example, the tilt sensors described above (e.g., using marbles inside plastic bubbles mounted to a package) cannot be reset to a default state. Once a tilt sensor, as described above, reaches a maximum tilt state, it cannot be reset for subsequent reuse. A new tilt sensor must be used in place of the old "spent" tilt sensor. This, of course, is a waste of resources and could be overcome with a resettable mechanical tilt sensor.

Some conventional tilt sensors are electronic and/or electro-mechanical. Such electronic or electro-mechanical tilt sensors may require a battery to power the tilt sensor. Over time, batteries may go flat (e.g., die, lose their charge, etc.). For example, a package may be stored for a long period of time between a first stage of a shipment and a second stage of the shipment. During storage, the battery powering an electronic tilt sensor coupled to the package may lose its charge. The tilt sensor may then become inoperable and be incapable of collecting or recording tilt data after storage. Moreover, batteries generally include materials that can be toxic, and batteries may increase the cost of tilt sensors. Accordingly, a tilt sensor that does not rely on a battery to power the tilt sensor may prove advantageous.

Aspects and embodiments of the present disclosure provide a resettable mechanical tilt sensor, which may be used for shipping packages and/or for other applications in which it is advantageous to keep track of an amount of tilt experienced by an object. In some embodiments, a tilt sensor includes a one-way rotational drive to translate rotational motion of a pendulum coupled to an input shaft into rotational movement of an output shaft. Movement of the pendulum may cause the input shaft of the one-way rotational drive to rotate a first rotational (e.g., angular) direction about an axis of the input shaft and a second rotational direction about the axis of the input shaft. The output shaft may rotate in a same direction responsive to movement of the input shaft in the first rotational direction or the second rotational direction via two or more gears.

The pendulum may move (i.e., rotate) responsive to a tilt motion of the tilt sensor due to gravity. For example, the tilt sensor may be tilted (e.g., during shipment of a package to which the tilt sensor is coupled) and the pendulum may move relative to a body of the tilt sensor (e.g., a housing of the tilt sensor) so that it is pointing towards the earth responsive to the tilting. A weight at a distal end of the pendulum may cause the pendulum to hang substantially in the direction of the force of gravity. Upon a tilting of the tilt sensor, the pendulum may move to remain substantially in line with the direction of the force of gravity.

In some embodiments, the tilt sensor includes a motion meter coupled to the output shaft of the one-way rotational drive. The motion meter may be a mechanical counter to display a measure of total tilt motion of the tilt sensor. The motion meter may be mechanical in some embodiments, or may be electro-mechanical in some embodiments. In at least an embodiment, the motion meter may be an electrical counter. The motion meter may have an analog (i.e., mechanical) display and/or may have a digital display viewable by a user (e.g., a technician, etc.). In some embodiments, the motion meter is resettable by the user so that the tilt sensor can be used again.

In some embodiments, the tilt sensor includes a first pin and a side portion forming a channel. The channel may include multiple ratchet slots to retain the first pin. The channel may guide the first pin along the channel responsive to the pendulum pushing the first pin in a first direction along the channel. The ratchet slots may prevent motion of the first pin in a direction opposite the first direction. A position of the first pin retained by a ratchet slot may be indicative of a maximum tilt of the tilt sensor in the first direction. Additionally, the channel (or a second channel) may guide a second pin along the channel (or the second channel) responsive to the pendulum pushing the second pin in a second direction along the channel (or the second channel). The channel or second channel may include additional ratchet slots that prevent motion of the second pin in the first direction. A position of the second pin retained by a ratchet slot may be indicative of a maximum tilt of the tilt sensor in the second direction. Further, in some embodiments, the first pin and/or second pin can be manually placed in a neutral position along the channel and/or second channel by a user (e.g., the first pin and/or second pin can be reset to a default state by a user).

Advantages of the present disclosure may include, but are not limited to, providing a resettable mechanical tilt sensor, providing a tilt sensor that measures total accumulated tilt over time, providing a tilt sensor with increased accuracy and/or sensitivity, and/or providing a tilt sensor that is unaffected by jostling (e.g., that does not measure jostling as tilt). The tilt sensor described in embodiments may be capable of being coupled to a package. The tilt sensor may be manually resettable, thus allowing the tilt sensor to be used and re-used multiple times. Additionally, the tilt sensor in embodiments may be capable of being stored for long periods of time without degradation, unlike conventional electronic tilt sensors which may lose battery charge over time. Thus, the tilt sensor in embodiments may be capable of tracking tilt data after long-term storage. Further, the tilt sensor in embodiments including a pendulum to turn a one-way rotational drive may allow the tracking of total tilt motion, unlike conventional mechanical tilt sensors described above which are only capable of tracking a maximum tilt angle or an instantaneous tilt angle. Additionally, the mechanical tilt sensor in embodiments is not susceptible to losing tilt data like conventional tilt sensors are, especially during unpackaging of a package to which the tilt sensor is coupled. All of these advantages may combine to provide a mechanical tilt sensor that is capable of re-use while tracking total tilt motion and a maximum tilt angle in embodiments, leading to less waste (e.g., of "used" tilt sensors) and increased tilt data accuracy.

FIG. 1 is a perspective view of a package containing a resettable mechanical tilt sensor, in accordance with at least some embodiments. In some embodiments, a shipping system 100 may include a package 110 having a top wall, a bottom wall, and one or more sidewalls to enclose an interior volume. Package 110 may be, for example, a box such as a cardboard box, a crate, or other type of package. In some embodiments, the package 110 may be configured to house a product 130. Product 130 may be any material for shipment. For example, product 130 may be a computer server (e.g., a datacenter server).

A tilt sensor 120, in some embodiments, may be fastened to an inner wall or outer wall of package 110. In some embodiments, the package 110 may be omitted, and the tilt sensor 120 may be attached directly to product 130. In some embodiments, product 130 is shipped on a pallet, and tilt sensor 120 is attached to the pallet.

Tilt sensor 120 may be a resettable mechanical tilt sensor as described below. In some embodiments, tilt sensor 120 is an unpowered (e.g., substantially unpowered) tilt-sensing system. In some embodiments, tilt sensor 120 includes a one-way rotational drive, a pendulum coupled to an input shaft of the one-way drive, and a motion meter coupled to an output shaft of the one-way drive. In some embodiments, tilt sensor 120 includes a housing to contain the one-way rotational drive, the pendulum, and/or the motion meter. In some embodiments, the motion meter is viewable (e.g., to a user, a technician, etc.) via one or more windows (e.g., a top window, a side window, etc.) of the housing. In one embodiment, a total motion meter is viewable via a top window, and one or more maximum tilt sensors are viewable via a side window. In some embodiments, tilt sensor 120 includes a channel (or multiple channels) having multiple ratchet slots to retain one or more pins. In some embodiments, the channel(s) is formed in a side portion of the housing. The channel(s) may be viewable via a window of the housing and/or via side window 114. More details pertaining to tilt sensor 120 are described below.

Tilt sensor 120 may be fastened to one or more interior walls of package 110 by one or more mechanical fasteners (e.g., nails, screws, bolts, etc.) and/or an adhesive. For example, multiple screws may be used to fasten a housing of tilt sensor 120 to an interior sidewall of package 110. In another example, the housing of tilt sensor 120 may be fastened to a bracket and/or an assembly that is included within the package 110. In such an example, the bracket and/or assembly to which the tilt sensor 120 is fastened may be securely packaged inside package 110 with packaging materials (e.g., styrofoam, cardboard, etc.). Although tilt sensor 120 is illustrated as being coupled to an interior wall of package 110 near an upper front interior corner of package 110, tilt sensor 120 may be coupled at any point to an interior wall of package 110.

Tilt sensor 120 may be coupled to an interior wall of package 110 such that tilting of package 110 is translated to tilt sensor 120. In some embodiments, to accurately sense tilt angles and tilting motions of the package 110 during shipment and/or handling, tilt sensor 120 may be rigidly coupled to package 110 and/or fastened within package 110. In some embodiments, tilt sensor 120 is coupled to package 110 via one or more bushings. The one or more bushings may insulate tilt sensor 120 from slight jarring and/or vibrations to package 110 while still allowing tilt sensor 120 to sense tilt angles and tilting motion of package 110. The one or more bushings may be rubber bushings, plastic bushings, polyurethane bushings, and/or another suitable bushing material.

In some embodiments, although not illustrated, tilt sensor 120 may be coupled or fastened to an exterior of package 110. In such embodiments, package 110 may form a cutout in an outer surface into which tilt sensor 120 may fit. The tilt sensor 120 may sit in a recess of package 110.

In some embodiments, shipping system 100 includes two or more tilt sensors 120. For example, a first tilt sensor 120 and a second tilt sensor 120 may be fastened and/or coupled to one or more interior surfaces of package 110. The first tilt sensor 120 may sense tilt in a first direction and a second direction (e.g., forward and back about a first horizontal axis) and the second tilt sensor 120 may sense tilt in a third direction and a fourth direction (e.g., side to side about a second horizontal axis that is orthogonal to the first horizontal axis). The first tilt sensor 120 may detect tilt in a first plane, while the second tilt sensor 120 may detect tilt in a second plane. In such an example, the first tilt sensor 120 and the second tilt sensor 120 may be oriented substantially perpendicular to one another. Additionally, the first tilt sensor 120 may be fastened to a front or rear wall of package 110 and the second tilt sensor 120 may be fastened to a left side sidewall or a right side sidewall of package 110. Including two tilt sensors 120 may allow for tilting motion in all directions to be sensed and/or recorded.

Figure 2A:
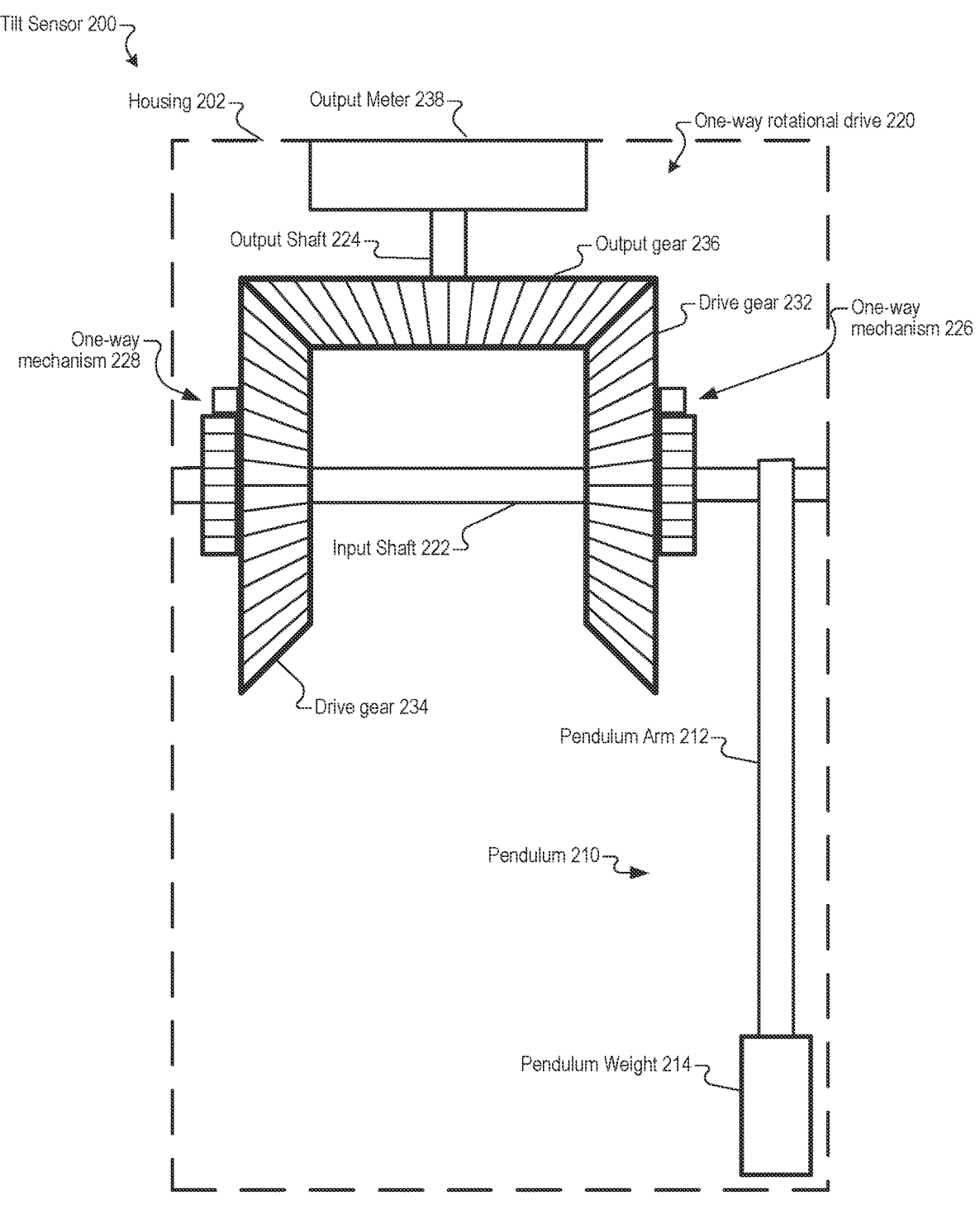
FIG. 2A is a cross-sectional front view of a resettable mechanical tilt sensor, in accordance with at least some embodiments.
Figure 2B:
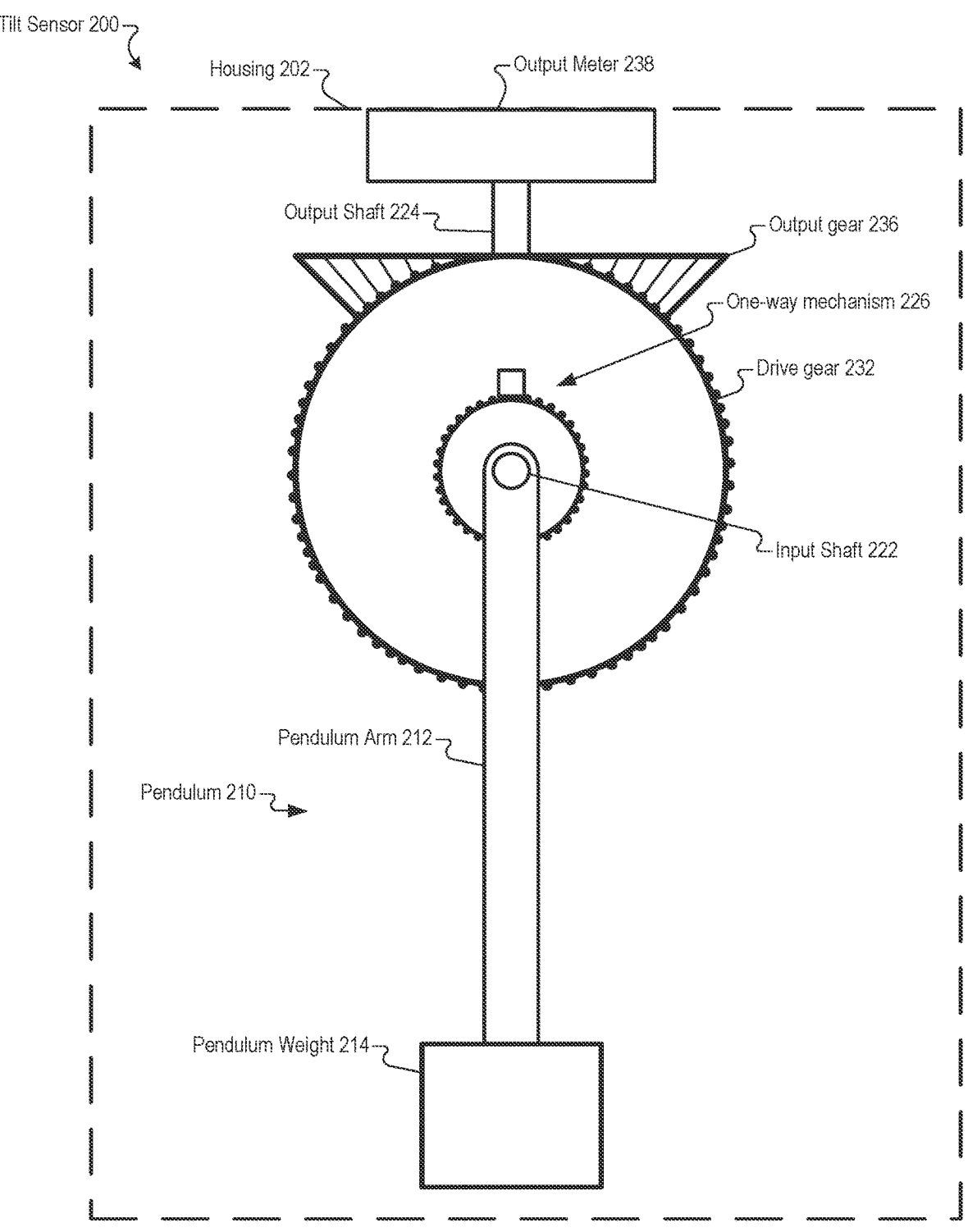
FIG. 2B is a cross-sectional side view of a resettable mechanical tilt sensor, in accordance with at least some embodiments.
Figure 2C:
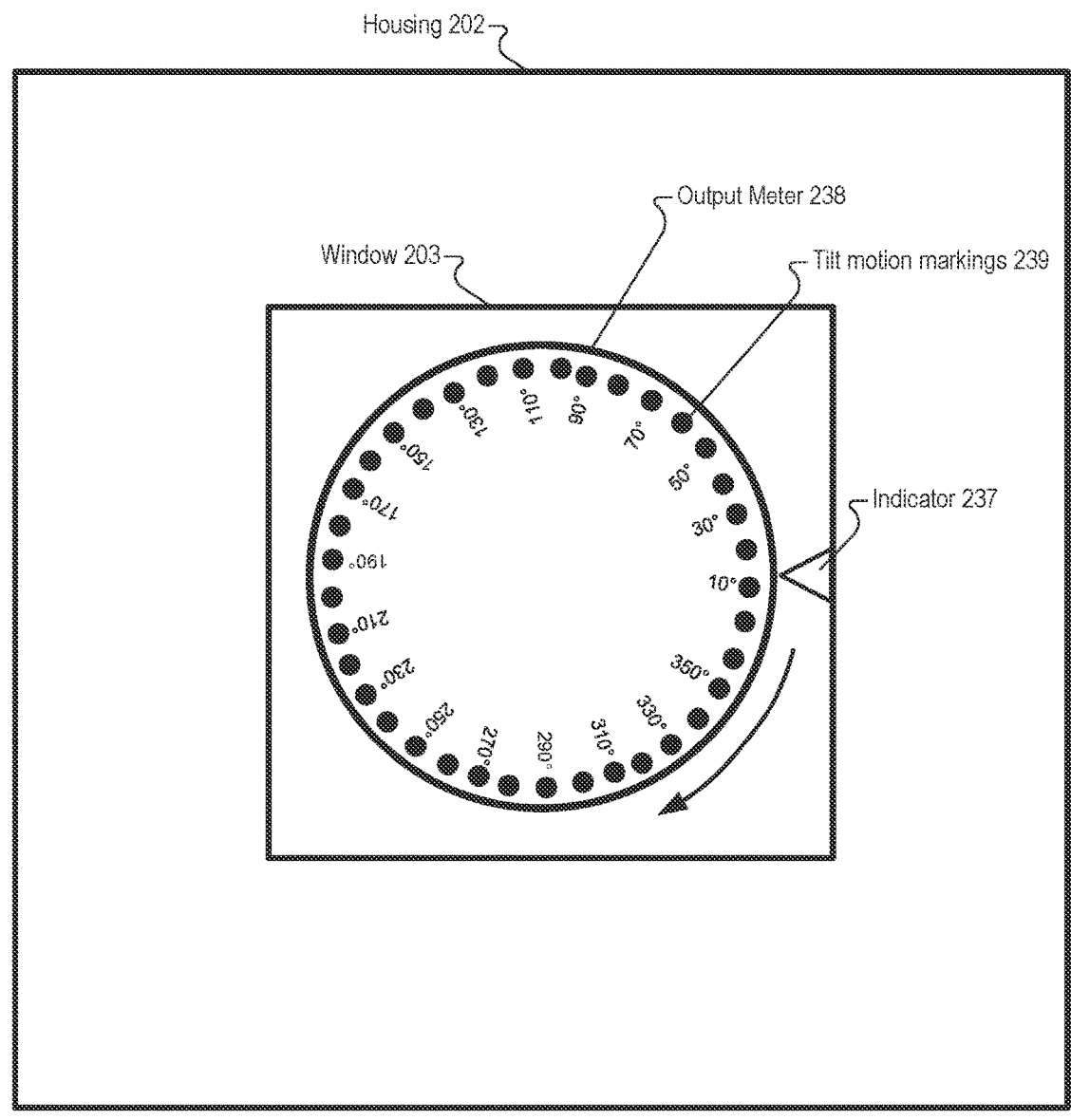
FIG. 2C is a top view of a resettable mechanical tilt sensor, in accordance with at least some embodiments.

FIG. 2A is a cross-sectional front view of a resettable mechanical tilt sensor 200, in accordance with at least some embodiments. FIG. 2B is a cross-sectional side view of resettable mechanical tilt sensor 200, in accordance with at least some embodiments. FIG. 2C is a top view of a resettable mechanical tilt sensor 200, in accordance with at least some embodiments. In some embodiments, tilt sensor 200 is configured to sense and/or record tilt motion and/or a tilt angle in two directions (e.g., forward tilt and backward tilt, or left tilt and right tilt) via multiple mechanical components. In some embodiments, tilt sensor 200 is configured to sense and/or record tilt motion and/or a tilt angle in four directions (e.g., clockwise and counterclockwise about a first axis and clockwise and counterclockwise about a second axis that may be orthogonal to the first axis). In some embodiments, tilt sensor 200 may be configured to be included inside a package that is to be shipped (e.g., via truck, train, air, etc.). Tilt sensor 200 may sense and/or record tilt motion of the package during shipment. One or more components of tilt sensor 200 may be made of a metal material, a plastic material, a polymer material, and/or any suitable material given the load and wear characteristics of the particular component.

In some embodiments, tilt sensor 200 includes a housing 202. Housing 202 may have a top wall, a bottom wall, and one or more sidewalls. In some embodiments, housing 202 may form a top window (e.g., window 203) and/or a side window. Housing 202 may form an interior volume in which components of tilt sensor 200 (e.g., as described below) are enclosed. In some embodiments, housing 202 may be configured to couple to an interior or exterior sidewall of a package (e.g., package 110 of FIG. 1). One or more of the top wall, bottom wall, or one or more sidewalls of the housing 202 may form one or more holes through which mechanical fasteners (e.g., bolts, screws, etc.) can be inserted to fasten (e.g., couple) tilt sensor 200 to a package. In some embodiments, housing 202 can be coupled to a bracket to be inserted into a package. In some embodiments, housing 202 may be made of a plastic material and/or may be made of a metal material. In some embodiments, housing 202 may be made of a fibrous material (e.g., cardboard, pressboard, wood, etc.).

In some embodiments, tilt sensor 200 includes a pendulum 210 coupled to a one-way rotational drive 220. In some embodiments, pendulum 210 includes a pendulum arm 212 and a pendulum weight 214. Pendulum 210 may be coupled to one-way rotational drive 220 at a first end of pendulum arm 212. Pendulum weight 214 may be coupled to a second end of pendulum arm 212. Pendulum 210 may be configured to align with the direction of the force of gravity (e.g., hang down) as tilt sensor 200 is tilted. Thus, as an example, as tilt sensor 200 is tilted, pendulum 210 may rotate about an axis (e.g., of input shaft 222) at the first end of pendulum arm 212 relative to the housing 202. Pendulum 210 may rotate a first direction (e.g., clockwise) responsive to the tilt sensor 200 tilting in the first direction, and pendulum 210 may rotate a second direction (counterclockwise) responsive to the tilt sensor 200 tilting in the second direction. In some embodiments, pendulum 210 is damped by a damper (not illustrated). The damper may attenuate vibrations or accelerations experienced by pendulum 210. The damper may cause movement (e.g., rotation) of pendulum 210 to more accurately reflect a tilt experienced by tilt sensor 200, and may mitigate jostling as being recorded as tilt.

In some embodiments, tilt sensor 200 includes a one-way rotational drive 220. One-way rotational drive 220 may be supported by housing 202 (e.g., via one or more bearings or bearing surfaces between input shaft 222 and housing 202). Pendulum 210 may be coupled to one-way rotational drive 220. In some embodiments, pendulum 210 is coupled, at a first end of pendulum arm 212, directly to an input shaft 222 of one-way rotational drive 220. In other embodiments, pendulum 210 is coupled to input shaft 222 via one or more shafts and/or a gear train (e.g., one or more gears). Coupling pendulum 210 to input shaft 222 via a gear train may amplify or attenuate movement (e.g., rotation) of pendulum 210. In some embodiments, pendulum 210 may be coupled to input shaft 222 proximate an end of input shaft 222. In some embodiments, pendulum 210 may be coupled to input shaft 222 proximate a middle of input shaft 222 (e.g., between drive gear 232 and drive gear 234). In some embodiments, at least a portion of input shaft 222 may be splined. A coupling hole of pendulum arm 212 may be appropriately splined to fit onto a splined portion of input shaft 222. The splined fitting (e.g., between pendulum arm 212 and input shaft 222) may rotationally constrain pendulum 210 and input shaft 222. In some embodiments, pendulum 210 is constrained to input shaft 222 via a screw and/or a setscrew (e.g., not illustrated).

In some embodiments, input shaft 222 is mechanically coupled to one or more one-way mechanisms (e.g., one-way mechanism 226 and/or one-way mechanism 228). In some embodiments, one-way mechanism 226 and/or one-way mechanism 228 are rotational one-way mechanisms. One-way mechanism 226 and/or one-way mechanism 228 may each be a one-way motion controller (e.g., a one-way rotational motion controller). One-way mechanism 226 and/or one-way mechanism 228 may each be one-way clutches. For example, one-way mechanism 226 and/or one-way mechanism 228 may be a ratchet system, a one-way roller bearing system, or a one-way springless roller ramp clutch system (e.g., see FIGS. 4A-4D). One-way mechanism 226 and/or one-way mechanism 228 may translate rotational motion in a single direction to a drive gear while allowing the drive gear to free spin an opposite direction, as described in more detail below.

In some embodiments, one-way mechanism 226 is mechanically coupled to drive gear 232. One-way mechanism 226 may be configured to drive drive gear 232. Input shaft 222 may pass through an opening of drive gear 232. Drive gear 232 may ride on a bearing (e.g., a journal bearing, a ball bearing, a roller bearing, a bearing surface, etc.) separating drive gear 232 and input shaft 222 so that drive gear 232 and input shaft 222 can rotate independently of each other. In some embodiments, an input portion of one-way mechanism 226 (e.g., a ratchet wheel of a ratchet system, a hub of a one-way roller system, etc.) may be coupled to input shaft 222. An output portion of one-way mechanism 226 (e.g., a base of a ratchet system, a ring of a one-way roller clutch system, etc.) may be coupled to drive gear 232. In some embodiments, one-way mechanism 226 may translate rotational motion of input shaft 222 in a first rotational direction (e.g., responsive to a rotational movement of pendulum 210 in the first rotational direction) to drive gear 232. One-way mechanism 226 may allow the input shaft 222 to free spin in a second rotational direction without translating the rotational movement in the second direction to the drive gear 232. In some embodiments, one-way mechanism 226 drives drive gear 232 the first rotational direction when input shaft 222 spins the first rotational direction, but does not drive drive gear 232 the second rotational direction when input shaft 222 spins the second rotational direction. In some embodiments, one-way mechanism 226 allows drive gear 232 to ratchet and/or free-spin when input shaft 222 rotates the second rotational direction.

In some embodiments, and similar to one-way mechanism 226, one-way mechanism 228 is mechanically coupled to drive gear 234. One-way mechanism 228 may be configured to drive drive gear 234. Input shaft 222 may pass through an opening of drive gear 234. Drive gear 234 may ride on a bearing separating drive gear 234 and input shaft 222 so that drive gear 234 and input shaft 222 can rotate independently of each other. In some embodiments, an input portion of one-way mechanism 228 may be coupled to input shaft 222. An output portion of one-way mechanism 228 may be coupled to drive gear 234. In some embodiments, one-way mechanism 228 may translate rotational motion of input shaft 222 in the second rotational direction (e.g., responsive to rotational movement of pendulum 210 in the second rotational direction) to drive gear 234. One-way mechanism 228 may allow the input shaft 222 to free spin in the first rotational direction without translating the rotational movement in the first direction to drive gear 234. In some embodiments, one-way mechanism 228 drives drive gear 234 in the second rotational direction when input shaft 222 spins the second rotational direction, but does not drive drive gear 234 the first rotational direction when input shaft 222 spins the first rotational direction. In some embodiments, one-way mechanism 228 allows drive gear 234 to ratchet and/or free spin when input shaft 222 rotates the first rotational direction.

In some embodiments, each of drive gear 232 and drive gear 234 may be bevel gears. Each of drive gear 232 and drive gear 234 may include multiple gear teeth. In some embodiments, the gear teeth are straight-cut. In other embodiments, the gear teeth are helically cut or hypoidially cut. In some embodiments, each of drive gear 232 and drive gear 234 are worm gears configured to drive a perpendicular straight-cut output gear. A gear pitch (e.g., spacing of gear teeth) may control a resolution of tilt sensor 200. For example, a smaller gear pitch may provide a finer resolution, while a larger gear pitch may provide a coarser resolution. In some embodiments, each of drive gear 232 and drive gear 234 drive output gear 236. In some embodiments, each of drive gear 232 and drive gear 234 are in constant mesh with output gear 236. In some embodiments, output gear 236 is bevel gear. The teeth of output gear 236 may mesh with the teeth of drive gear 232 and drive gear 234. In some embodiments, output gear 236 rotates about an axis substantially perpendicular to an axis about which drive gear 232 and/or drive gear 234 rotate.

In some instances, output gear 236 may spin one of drive gear 232 or drive gear 234. For example, when input shaft 222 rotates the first rotational direction, one-way mechanism 226 (e.g., having an input portion coupled to input shaft 222) may drive drive gear 232 the first direction. Drive gear 232 may drive output gear 236. Output gear 236 may in turn spin drive gear 234 responsive to output gear 236 being driven by drive gear 232. Drive gear 234 may be allowed to free-spin relative to input shaft 222 by way of one-way mechanism 228.

In some embodiments, an output meter 238 may be coupled to output gear 236 by an output shaft 224. In some embodiments, output shaft 224 is substantially perpendicular to input shaft 222. In other embodiments, output shaft 224 is substantially or approximately parallel to input shaft 222, being driven by output gears parallel to drive gear 232 and/or drive gear 234. In some embodiments, output meter 238 is mechanically coupled to output gear 236 via one or more shafts and/or a gear train. Mechanically coupling output meter 238 to output gear 236 via a gear train may tune a resolution of the tilt sensor 200. In some embodiments, output meter 238 records and/or displays a total measure of tilt motion of tilt sensor 200. Output meter 238 may count increments of rotational movement of output shaft 224. The increments of rotational movement of output shaft 224 may be indicative of tilt motion experienced by tilt sensor 200. For example, at a first time the tilt sensor 200 may be tilted in the first direction by 30 degrees. Accordingly, the output shaft 224 may be rotated to show a tilt of 30 degrees in output meter 238. At a second time, the tilt sensor 200 may be tilted in the second direction by 20 degrees. Accordingly, the output shaft 224 may be rotated to show a tilt of 50 degrees (e.g., 30 degrees plus 20 degrees). Further tilt in the first and/or second directions may be added to the output meter 238 as such tilt occurs. Accordingly, an aggregate or total tilt experienced by the tilt sensor 200 may be recorded.

Output meter 238, in some embodiments, may include an analog display. For example, output meter 238 may include a dial display (e.g., a needle and dial display). In some embodiments, output meter 238 includes multiple tilt motion markings 239 on a face of output meter 238. In one embodiment, as shown, the tilt motion markings 239 indicate a total amount of tilt experienced by the tilt sensor 200. In the example, markings are in 10 degree increments. However, markings may also be in 2 degree increments, 5 degree increments, 15 degree increments, 25 degree increments, or any other increments as appropriate to an application for which the tilt sensor 200 will be used. In some embodiments, tilt motion markings 239 may rotate relative to indicator 237 responsive to tilt sensor 200 experiencing tilt. Indicator 237 may point at a tilt motion marking 239 indicative of total tilt recorded by the tilt sensor 200 via the output meter 238. In some embodiments, indicator 237 rotates relative to tilt motion markings 239. In some embodiments, output meter 238 may include an analog counter (e.g., similar to an automobile analog odometer). In some embodiments, a display of output meter 238 may be viewable via window 203. Output meter 238 may be resettable by a user. For example, a user may be capable of resetting output meter 238 to a default setting (e.g., displaying zero total tilt motion) via a button, lever, and/or other suitable mechanism. In some embodiments, a user may manually reset a display (e.g., counter, needle, etc.) of output meter 238. In some embodiments, output meter 238 may be viewable (e.g., by a user) via a window formed in a top surface of housing 202. In some embodiments, output meter 238 may protrude from housing 202. In some embodiments, output meter 238 includes a digital display. Output meter 238 may include, in some embodiments, an electro-mechanical counter.

In some embodiments, the tilt sensor 200 does not include one-way drive mechanism 228. In such an embodiment, only tilt in a first direction (e.g., only clockwise or counter-clockwise tilt) may be measured. As a result, the total amount of tilt measured by output meter 238 may be half of the total tilt that would be measured by the illustrated tilt sensor that includes both one-way mechanism 228 and one-way mechanism 226.

In some embodiments, in addition to or instead of including one-way rotational drive 220 and output meter 238 that measures total or aggregate tilt, tilt sensor 200 includes one or more a maximum tilt meters 303, which are described below.

Figure 3A:
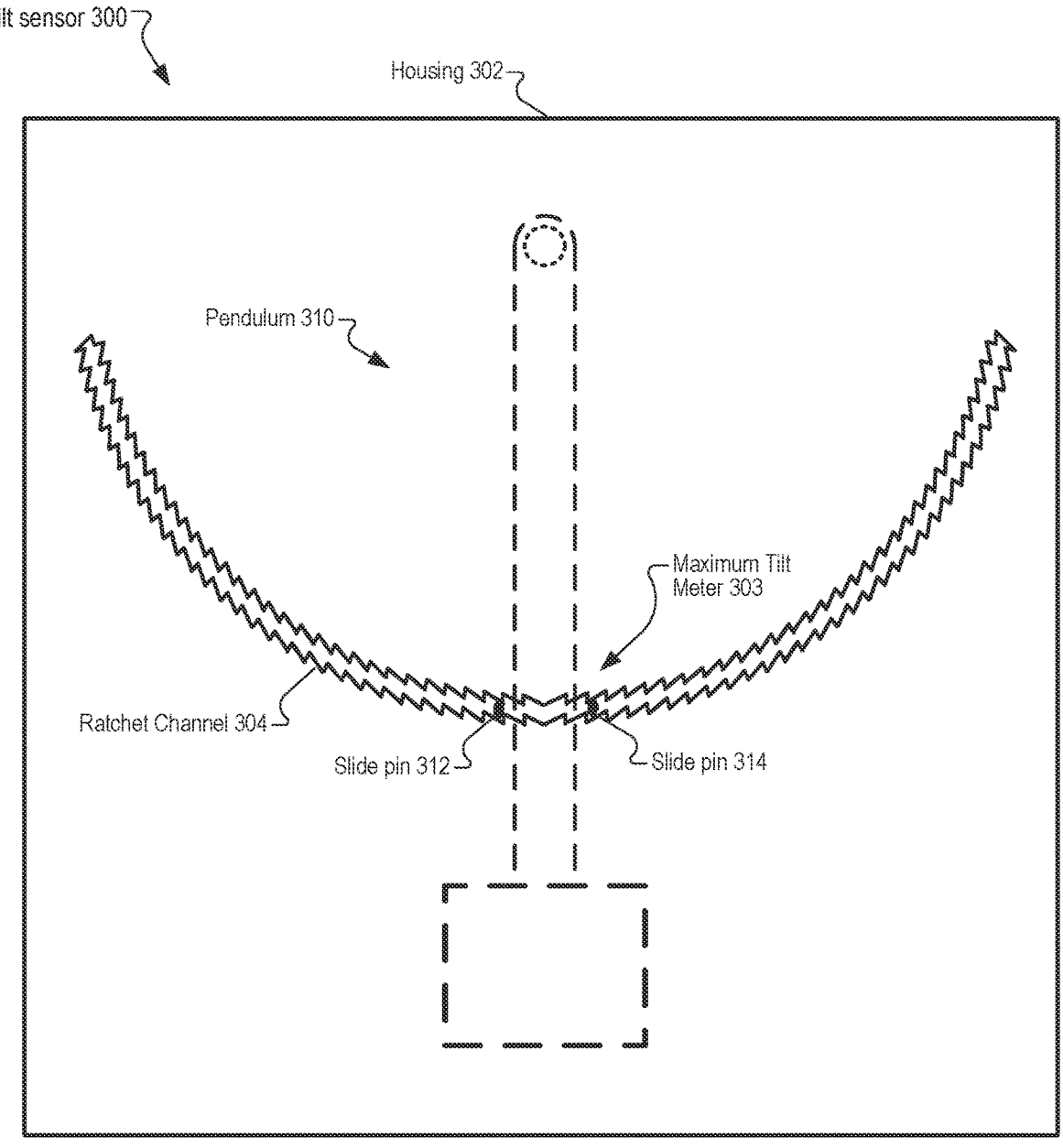
FIGS. 3A-3B are cross-sectional side views of a ratchet channel system of a resettable mechanical tilt sensor, in accordance with at least some embodiments.
Figure 3B:
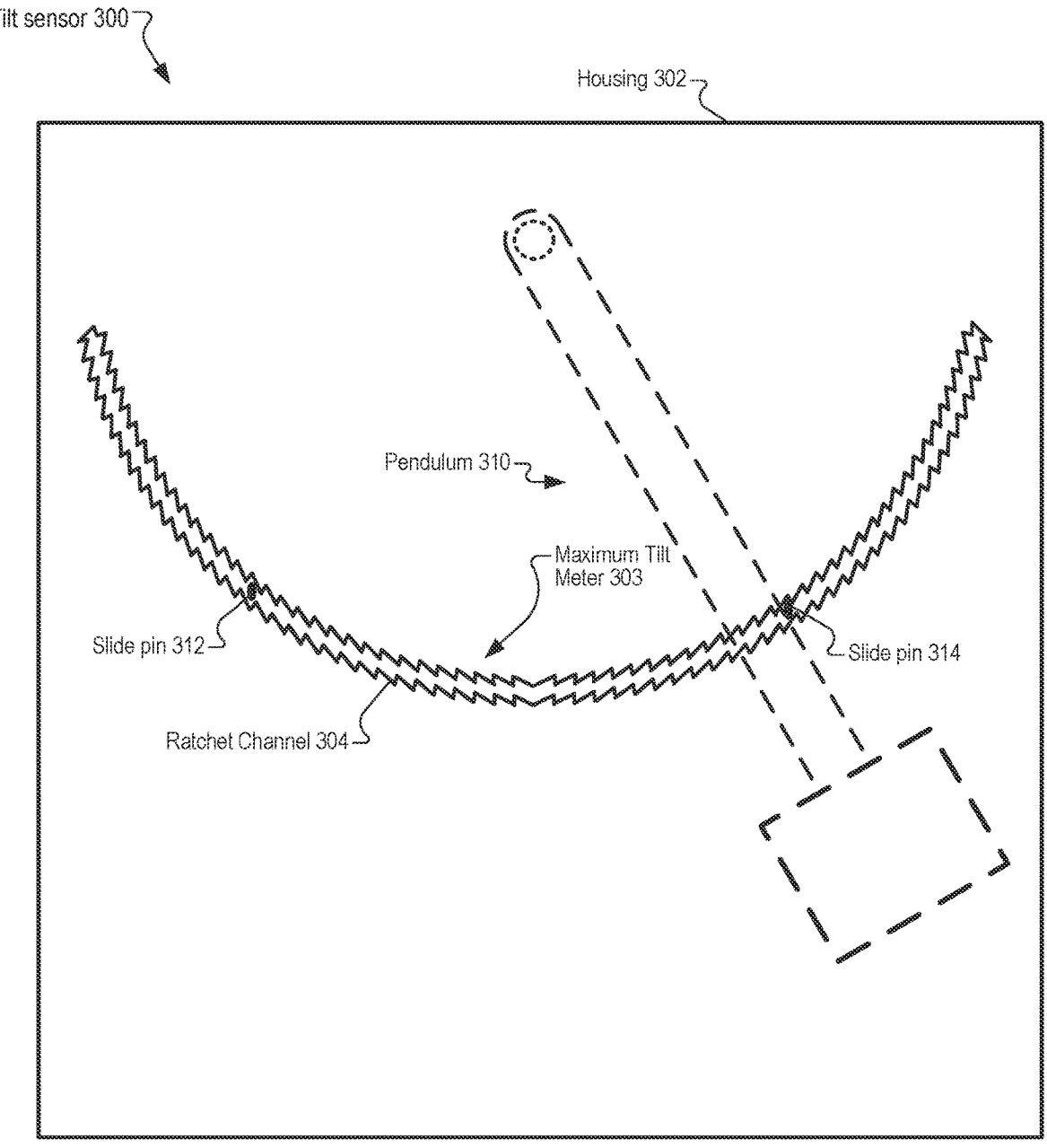
Figure 3C:
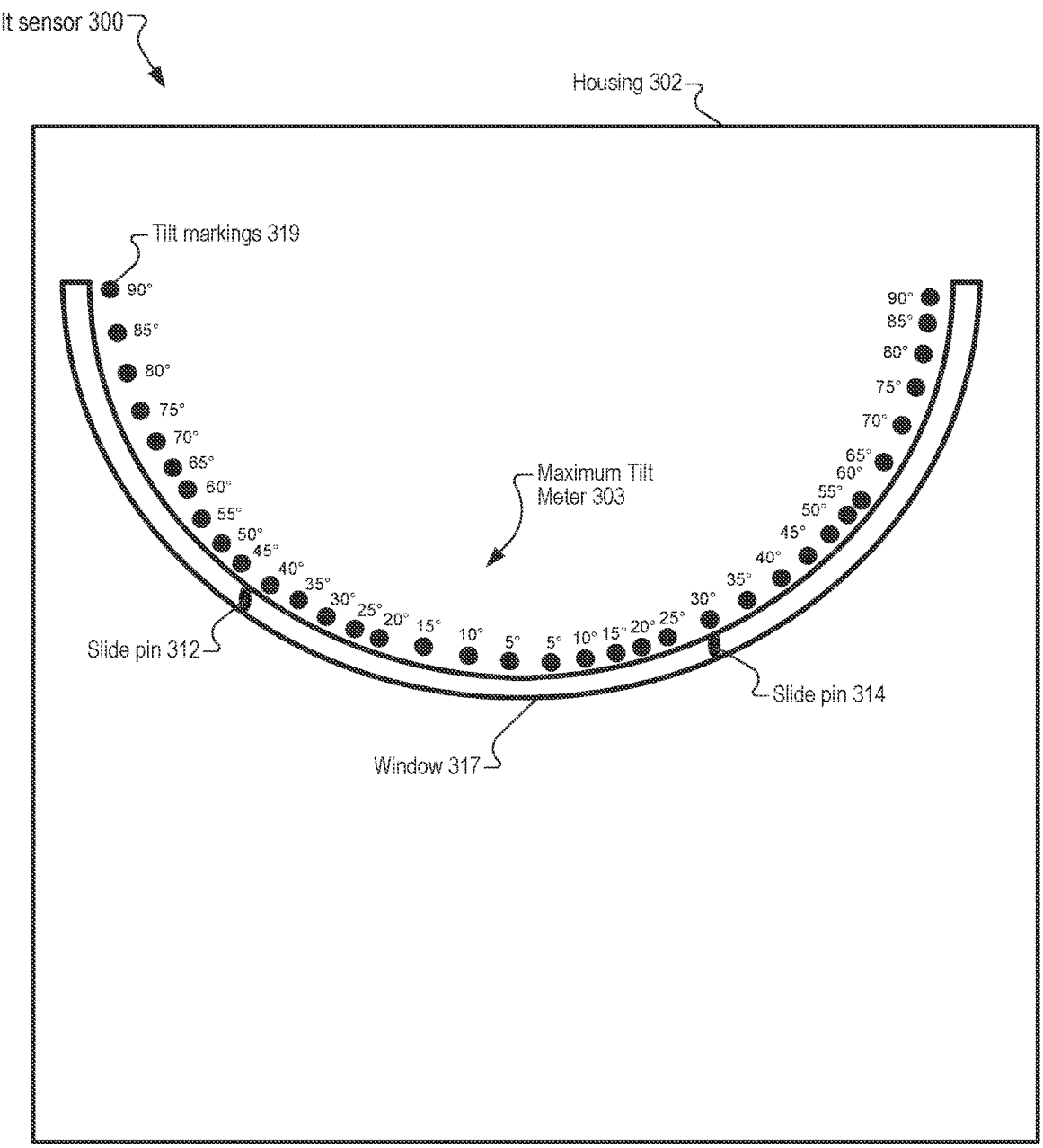
FIG. 3C is a side view of a resettable mechanical tilt sensor, in accordance with at least some embodiments.

FIGS. 3A-3B are cross-sectional side views of tilt sensor 300 that includes a maximum tilt meter 303. FIG. 3C is a side view of a resettable mechanical tilt sensor 300 that includes a maximum tilt meter 303, in accordance with at least some embodiments. Tilt sensor 300 may include a ratchet channel system, and may be a resettable mechanical tilt sensor 300, in accordance with at least some embodiments. In some embodiments, tilt sensor 300 corresponds to tilt sensor 200 of FIGS. 2A-2C, with the addition of maximum tilt meter 303. In some embodiments, tilt sensor 300 may include maximum tilt meter 303, while in other embodiments, tilt sensor 300 may not include maximum tilt meter 303. In some embodiments, tilt meter 303 may be included in a tilt sensor separate from the total tilt motion meter components described with respect to FIGS. 2A-2C. FIG. 3A may illustrate a ratchet channel system of tilt sensor 300 in a neutral state (e.g., default state, initial state, reset state, etc.). FIG. 3B may illustrate a ratchet channel system of tilt sensor 300 in a tilted state. FIG. 3C may illustrate a display of maximum tilt meter 303 indicating a maximum tilt angle recorded by tilt sensor 300.

In some embodiments, tilt sensor 300 includes a side portion forming a channel. The side portion may be a sidewall of a housing 302 (e.g., housing 202 of FIGS. 2A-2B). In some embodiments, the channel is ratchet channel 304. In some embodiments, ratchet channel 304 may be a substantially circumferential channel centered on a pivot point of a pendulum 310. Ratchet channel 304 may be disposed adjacent to pendulum 310 (e.g., pendulum 210 of FIGS. 2A-2B). In some embodiments, pendulum 310 may be disposed between a first portion and a second portion of ratchet channel 304. The first portion of ratchet channel 304 may support a first end of a slide pin (e.g., slide pin 314 and/or slide pin 312), and the second portion of ratchet channel 304 may support a second end of the slide pin. The first portion of ratchet channel 304 may be formed in a sidewall of housing 302 while the second portion of ratchet channel 304 may be disposed inboard of an interior surface of the sidewall. Pendulum 310 may move in a plane between the first portion of ratchet channel 304 and the second portion of ratchet channel 304 substantially parallel to the sidewall of housing 302. In some embodiments, ratchet channel 304 may guide slide pin 312 and/or slide pin 314 along a path of the ratchet channel 304 (e.g., a circumferential path). Slide pin 312 and/or slide pin 314 may be metal pins and/or plastic pins. In some embodiments, slide pin 312 and/or slide pin 314 are pushed along the circumferential path of ratchet channel 304 by pendulum 310 (e.g., by a pendulum arm and/or a pendulum weight of pendulum 310). For example, as illustrated in FIG. 3B, pendulum 310 may push slide pin 314 along a path of ratchet channel 304 responsive to tilt sensor 300 tilting a first direction. As another example, pendulum 310 may push slide pin 312 along a path of ratchet channel 304 responsive to tilt sensor 300 tilting a second direction.

In some embodiments, ratchet channel 304 may include multiple ratchet slots. The ratchet slots may be configured to prevent slide pin 314 and/or slide pin 312 from moving toward a neutral state (e.g., the center of ratchet channel 304, the bottom of ratchet channel 304) subsequent to being pushed to an elevated state by pendulum 310. In some embodiments, a first group of ratchet slots may prevent slide pin 314 from moving a second direction along the path of ratchet channel 304 subsequent to pendulum 310 pushing slide pin 314 a first direction along the path of ratchet channel 304. In some embodiments, a second group of ratchet slots may prevent slide pin 312 from moving a first direction along the path of ratchet channel 304 subsequent to pendulum 310 pushing slide pin 314 a second direction along the path of ratchet channel 304. For example, as illustrated in FIG. 3B, a ratchet slot may catch slide pin 312 at an elevated position along the path of ratchet channel 304 subsequent to pendulum 310 pushing slide pin 312 to the elevated position. The ratchet slot may prevent slide pin 312 from sliding down along the path of ratchet channel 304 subsequent to the pendulum 310 moving away in the second direction. In some embodiments, a position of slide pin 312 and/or slide pin 314 retained by a ratchet slot may be indicative of a maximum tilt achieved by tilt sensor 300 in the first direction and/or the second direction. In some embodiments, slide pin 312 and/or slide pin 314 can be reset to a default state. For example, a user can manually move slide pin 312 and/or slide pin 314 to a bottom and/or center position along a path of ratchet channel 304.

Referring to FIG. 3C, in some embodiments, tilt sensor 300 may include maximum tilt meter 303. In some embodiments, housing 302 may form window 317 (e.g., a side window). Slide pin 312 and/or slide pin 314 may be viewable through window 317. Multiple tilt markings 319 may indicate a maximum tilt experienced by tilt sensor 300 in a first direction and/or in a second direction. Tilt markings 319 may be graduations indicative of tilt angles. In the example, markings are in 5 degree increments. However, markings may also be in 1 degree increments, 2 degree increments, 10 degree increments, 15 degree increments, 25 degree increments, or any other increments as appropriate to an application for which the tilt sensor 300 will be used. In the example above (illustrated both in FIG. 3B and FIG. 3C), slide pin 312 and slide pin 314 may be pushed to elevated positions by pendulum 310. A position of slide pin 312 may correspond to one of the tilt markings 319 that indicates tilt sensor 300 experienced a maximum tilt of a first angle (e.g., approximately 40 degrees) in the first direction. A position of slide pin 314 may correspond to one of the tilt markings 319 that indicates tilt sensor 300 experienced a maximum tilt of a second angle (e.g., approximately 30 degrees) in the second direction. In some embodiments, tilt markings 319 may have a granularity of approximately five degrees. In some embodiments, tilt marking 319 may have a granularity of one degree or smaller.

FIGS. 4A-4D are schematic side views of one-way rotational motion controllers of a resettable mechanical tilt sensor (e.g., tilt sensor 200 of FIGS. 2A-2B, tilt sensor 300 of FIGS. 3A-3B), in accordance with at least some embodiments. FIG. 4A illustrates a ratchet system 410 as a one-way rotational motion controller. FIG. 4B illustrates a one way roller bearing system 420 as a one-way rotational motion controller. FIG. 4C illustrates a springless roller ramp clutch system 430 as a one-way rotational motion controller rotating a first direction. FIG. 4C illustrates a springless roller ramp clutch 430 as a one-way rotational motion controller rotating a second direction.

Referring to FIG. 4A, in some embodiments, ratchet system 410 may include ratchet wheel 412, pawl 414, and/or base 416. Ratchet wheel 412 may be a ratchet gear. In some embodiments, ratchet wheel 412 is coupled to an input shaft of a one-way rotational drive (e.g., input shaft 222 of one-way rotational drive 220 of FIGS. 2A-2B). Ratchet wheel 412 may be an input portion of ratchet system 410. In some embodiments, base 416 is coupled to a drive gear of a one-way rotational drive (e.g., one of drive gear 232 or drive gear 234 of FIG. 2A). Base 416 may be an output portion of ratchet system 410. Pawl 414 may be coupled to base 416. In some embodiments, pawl 414 is spring-loaded. For example, spring pressure (e.g., from a spring not illustrated) may engage pawl 414 against a ratchet step of ratchet wheel 412. Pawl 414 may prevent ratchet wheel 412 from rotating relative to base 416 in a first direction (e.g., clockwise as illustrated). Consequently, base 416 (being coupled to a drive gear) may rotate with ratchet wheel 412 in the first direction. Conversely, pawl 414 may allow ratchet wheel 412 to rotate relative to base 416 in a second direction (e.g., counter-clockwise as illustrated) as pawl 414 rides up the individual steps of ratchet wheel 412. This may allow ratchet wheel 412 to rotate freely relative to base 416 in the second direction.

Referring to FIG. 4B, in some embodiments, roller bearing system 420 may include a hub 422, one or more rollers 426, one or more springs 428, and a ring 424. In some embodiments, hub 422 is coupled to an input shaft of a one-way rotational drive. Hub 422 may be an input portion of roller bearing system 420. In some embodiments, ring 424 is coupled to a drive gear of a one-way rotational drive. Ring 424 may be an output portion of roller bearing system 420. Each of the springs 428 may be coupled to hub 422. Each of the rollers 426 may be under spring pressure from springs 428. In some embodiments, hub 422 may drive ring 424 a first direction (e.g., counter-clockwise as illustrated) via the rollers 426. For example, as hub 422 rotates the first direction, hub 422 may push against rollers 426 which in turn push against an inside surface of ring 424. A force of friction between hub 422, rollers 426, and/or ring 424 may cause ring 424 to rotate as hub 422 rotates the first direction. In some embodiments, hub 422 may be allowed to rotate a second direction (e.g., clockwise as illustrated) independent of ring 424. For example, as hub 422 rotates the second direction, hub 422 may lose contact (e.g., substantially lose contact) with rollers 426 which exert less force (or no force) against the inside surface of ring 424. Thus, hub 422 may rotate the second direction without ring 424 also rotating the second direction.

Referring to FIGS. 4C-4D, in some embodiments, springless roller ramp clutch system 430 may include a hub 432, a ring 434, and one or more rollers 436. In some embodiments, hub 432 is coupled to an input shaft of a one-way rotational drive. Hub 432 may be an input portion of springless roller ramp clutch system 430. In some embodiments, ring 434 is coupled to a drive gear of a one-way rotational drive. Ring 434 may be an output portion of springless roller ramp clutch system 430. Hub 432 may form one or more ramps. As hub 432 rotates a first direction (e.g., counter-clockwise as illustrated, see FIG. 4D), one or more ramp features of hub 432 may push against rollers 436, in turn pushing rollers 436 against an inner surface of ring 434. A force of friction between hub 432, rollers 436, and/or ring 434 may cause ring 434 to rotate as the hub 432 rotates the first direction. As hub 432 rotates a second direction (e.g., clockwise as illustrated, see FIG. 4C), one or more features of hub 432 may push against rollers 436. However, rollers 436 may not be pushed against the inner surface of ring 434 when hub 432 rotates the second direction. Thus, hub 432 may rotate the second direction independent of ring 434. In some embodiments, ring 434 may free-spin the first direction independent of hub 432.

As mentioned above, an input portion of a one-way rotational motion controller may be coupled to an input shaft of a one-way rotational drive (e.g., input shaft 222 of FIGS. 2A-2B). An output portion of a one-way rotational motion controller may be coupled to a drive gear of the one-way rotational drive (e.g., drive gear 232 or drive gear 234 of FIG. 2A). In some embodiments, a one-way rotational drive includes two one-way rotational motion controllers. Each of the one-way rotational motion controllers may be coupled to the input shaft and each to a respective drive gear. The two one-way rotational motion controllers and respective drive gears may be mirrored so that a first one-way rotational motion controller drives a first drive gear a first rotational direction responsive to the input shaft rotating the first direction, and so that a second one-way rotational motion controller drives a second drive gear a second rotational direction responsive to the input shaft rotating the second direction. The first one-way rotational motion controller may free-spin when the input shaft rotates the second direction and the second one-way rotational motion controller may free-spin when the input shaft rotates the first direction. The drive gears may both turn an output gear. The output gear may be driven one rotational direction regardless of whether the first drive gear is rotated the first direction or the second drive gear is rotated the second direction. In this manner, all rotational movement of the input shaft (e.g., regardless of the rotational movement of the input shaft being in the first rotational direction or the second rotational direction) may be reflected in rotational movement of the output gear.

Figure 5A:
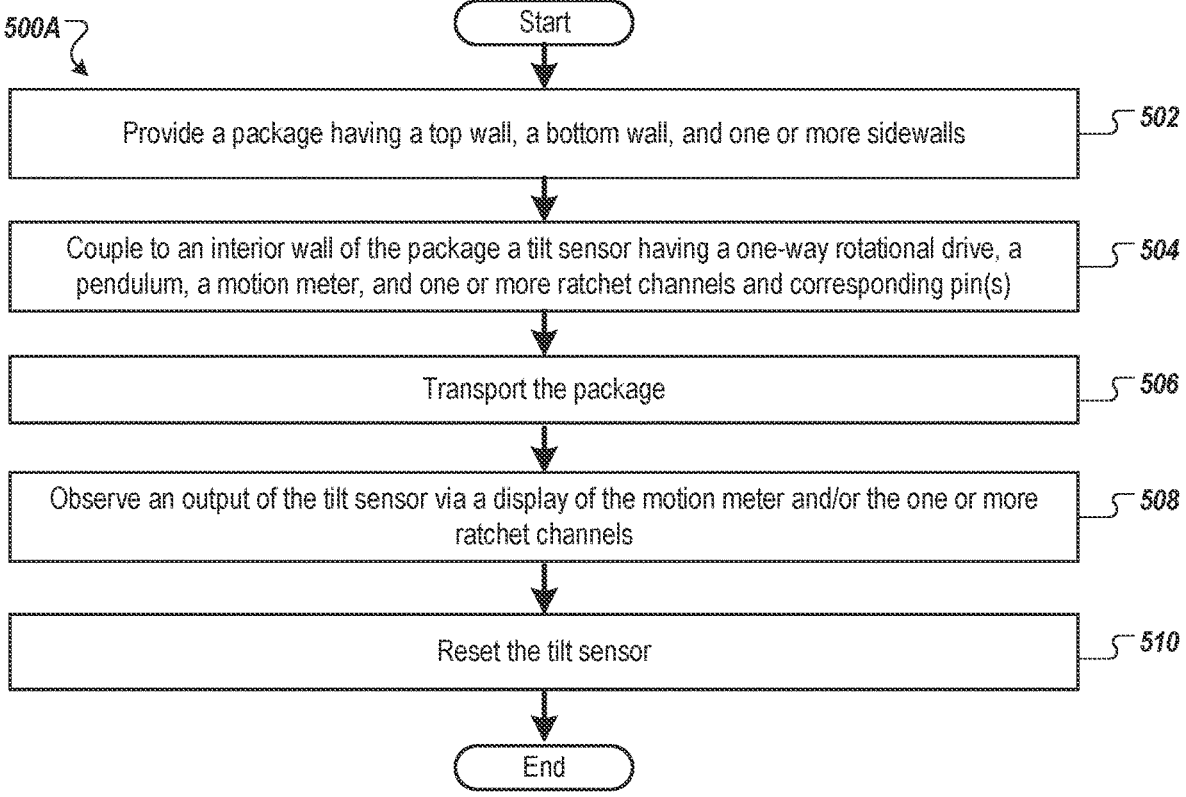
FIGS. 5A-5B are flow diagrams of methods of using a mechanical tilt sensor, in accordance with at least some embodiments.

FIG. 5A is a flow diagram of a method 500A of using a mechanical tilt sensor, in accordance with at least some embodiments. Method 500A may be performed by a user (e.g., a shipper, a receiver, a technician, etc.) of a shipping system (e.g., shipping system 100 of FIG. 1) and/or a tilt sensor (e.g., tilt sensor 200 of FIGS. 2A-2B, tilt sensor 300 of FIGS. 3A-3B). Although shown in a particular sequence or order, unless otherwise specified, the order of the processes may be modified. Thus, the illustrated embodiments should be understood only as examples, and the illustrated processes may be performed in a different order, and some processes may be performed in parallel. Additionally, one or more processes may be omitted in various embodiments. Thus, not all processes are required in every embodiment. Other process flows are possible.

At block 502, in some embodiments, a package is provided having a top wall, a bottom wall, and one or more sidewalls. The package may be package 110 of FIG. 1. The package may have provisions (e.g., a slot, fixture, screw holes, etc.) for receiving a tilt sensor. The package may contain materials or products to be shipped. The materials or products may be sensitive to tilting. For example, the products or materials may be sensitive to tilting motion and/or to a tilt angle.

At block 504, in some embodiments, a tilt sensor is coupled to an interior wall of the package. The tilt sensor may be a resettable mechanical tilt sensor. In some embodiments, the tilt sensor includes a one-way rotational drive, a pendulum, and one or more ratchet channels with corresponding slide pins. The tilt sensor may include a motion meter to display a total tilt motion sensed by the tilt sensor. The tilt sensor may be coupled to a wall of the package by a housing of the tilt sensor.

At block 506, in some embodiments, the package containing the tilt sensor is transported. Transporting the package may include any shipping and/or handling operations to transport the package from an origination location to a destination location. This may include handling by shipping personnel, handling by machinery (e.g., forklift, etc.), and/or transportation by vehicle (e.g., truck, train, airplane, ship, etc.). In some embodiments, transporting the package includes storing the package containing the tilt sensor. Storing the package may include storage over lengthy periods of time. While being transported, the package may experience many tilt motions and/or tilt angles as a result of handling and/or shipping. Such tilt angles and/or motions may be recorded by the tilt sensor, as described hereinabove.

At block 508, in some embodiments, an output of the tilt sensor may be observed via a display (e.g., through a window) of the motion meter. The motion meter may display a total tilt motion sensed by the tilt sensor. In some embodiments, a maximum tilt angle sensed by the tilt sensor may be observed by noting the location of the slide pin(s) in the ratchet channel. The various locations of different ratchets in a ratchet channel may be marked with associated tilt angles in embodiments. Accordingly, a recipient of the package may view the tilt sensor through one or more windows to quickly determine both a maximum tilt of the package in one or more directions and a total or aggregate tilt of the package during shipment. In some embodiments, the recipient of the package may be able to determine whether the package was mishandled based on the total tilt and/or the maximum tilt angle.

At block 510, in some embodiments, the tilt sensor may be reset. Resetting the tilt sensor may be accomplished by resetting the motion meter via a button, a lever, a linkage, and/or manually resetting the display. Resetting the tilt sensor may include, in some embodiments, manually replacing the slide pin(s) to a neutral position (e.g., at a center and/or bottom position of the ratchet channel). After the tilt sensor is reset, the tilt sensor may be re-used.

Figure 5B:
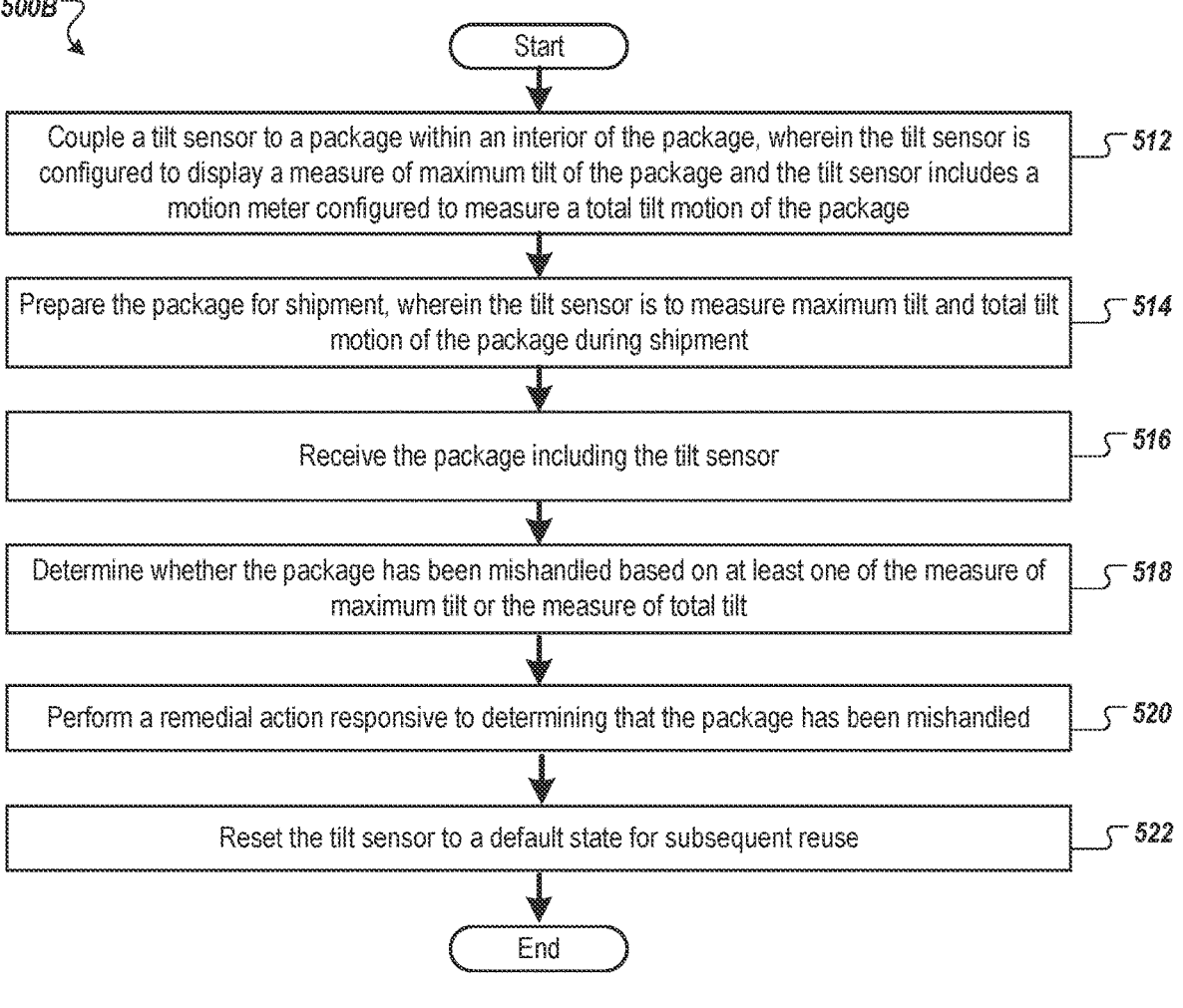

FIG. 5B is a flow diagram of a method 500B of using a mechanical tilt sensor, in accordance with at least some embodiments. Method 500B may be performed by a user (e.g., a shipper, a receiver, a technician, etc.) of a shipping system (e.g., shipping system 100 of FIG. 1) and/or a tilt sensor (e.g., tilt sensor 200 of FIGS. 2A-2B, tilt sensor 300 of FIGS. 3A-3B). Although shown in a particular sequence or order, unless otherwise specified, the order of the processes may be modified. Thus, the illustrated embodiments should be understood only as examples, and the illustrated processes may be performed in a different order, and some processes may be performed in parallel. Additionally, one or more processes may be omitted in various embodiments. Thus, not all processes are required in every embodiment. Other process flows are possible.

At block 512, in some embodiments, a user may couple a tilt sensor to a package. The tilt sensor may be coupled to at least one of a top wall of the package, a bottom wall of the package, or a sidewall of the package. In some embodiments, the tilt sensor may be coupled to the package within an interior of the package. The tilt sensor may be configured to measure maximum tilt and/or measure total tilt motion (e.g., of the package). In some embodiments, the tilt sensor is configured to display a measure of maximum tilt and/or a measure of total tilt motion (e.g., of the package) as described herein.

At block 514, in some embodiments, a user may prepare the package for shipment. The tilt sensor may be configured to measure the maximum tilt and the total tilt motion of the package during shipment. Preparing the package for shipment may include placing the package on a pallet, wrapping the package, closing and/or sealing the package, and so on. The package may than be shipped to a recipient. Such shipment may include handling the package at one or multiple locations and/or facilities (e.g., placing the package on one or vehicles such as trains, planes, automobiles, etc., placing the package in one or more shipping containers, etc.), and then moving the package between locations using one or more automobiles.

At block 516, in some embodiments, a user (e.g., the same or different user as in blocks 512 and 514, a second user, etc.) may receive a package that has been shipped to a destination. The package may include the tilt sensor as described herein.

At block 518, in some embodiments, the user (e.g., the second user) may determine whether the package has been mishandled during shipment based on at least one of the measure of maximum tilt or the measure of total tilt as shown by the tilt sensor. The user may determine that the package has been mishandled by the measure of maximum tilt exceeding a threshold tilt angle, and/or by the measure of total tilt exceeding a threshold total tilt value.

At block 520, in some embodiments, the user may perform a remedial action responsive to determining that the package has been mishandled. In some examples, the remedial action may include inspection of the contents of the package and/or perform maintenance on the contents of the package. The remedial action may also include refusal to accept the shipment of the package.

At block 522, in some embodiments, the user may reset the tilt sensor (e.g., the motion meter of the tilt sensor) to a default state for subsequent reuse of the tilt sensor. The tilt sensor may be removed from the package and placed in a new package. Alternatively, the package may be reused to transport new contents.

Other variations are within the scope of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical contact with each other. "Coupled" may also mean that two or more elements are not in direct contact with each other, but yet still co-operate or interact with each other.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A tilt sensor comprising:
a rotational drive configured to translate rotational motion of an input shaft in a first rotational direction about a first axis of the input shaft and in a second rotational direction about the first axis of the input shaft into rotational movement in a first rotational direction about a second axis of an output shaft;
a pendulum coupled to the input shaft of the rotational drive, wherein the pendulum is configured to rotate the input shaft in the first rotational direction about the first axis or the second rotational direction about the first axis responsive to a tilt motion of the tilt sensor; and
a motion meter coupled to the output shaft of the rotational drive, wherein the motion meter is configured to display a measure of total tilt motion of the tilt sensor.

2. The tilt sensor of claim 1, wherein the rotational drive comprises:
a first one-way motion controller coupled to the input shaft; and
a first gear, wherein the first one-way motion controller is configured to drive the first gear in the first rotational direction about the first axis responsive to the tilt sensor tilting in a first direction and the input shaft rotating in the first rotational direction about the first axis.

3. The tilt sensor of claim 2, wherein the rotational drive further comprises:
a second one-way motion controller coupled to the input shaft;
a second gear, wherein the second one-way motion controller is configured to drive the second gear in the second rotational direction about the first axis responsive to the tilt sensor tilting in a second direction and the input shaft rotating in the second rotational direction about the first axis; and
a third gear, wherein the first gear and the second gear are configured to drive the third gear, wherein the third gear is coupled to the output shaft.

4. The tilt sensor of claim 2, wherein the first one-way motion controller comprises at least one of a ratchet gear, a one-way roller bearing or a springless roller ramp clutch.

5. The tilt sensor of claim 1, wherein the first axis and the second axis are perpendicular.

6. The tilt sensor of claim 1, wherein the pendulum comprises a weight coupled to a first end of an arm, wherein a second end of the arm is coupled to the input shaft, and wherein the weight is configured to move opposite the tilt motion of the tilt sensor to rotate the input shaft.

7. The tilt sensor of claim 1, wherein the motion meter comprises a mechanical counter configured to count one or more increments of rotational movement of the output shaft, wherein the one or more increments of rotational movement of the output shaft are indicative of a total measure of tilt motion of the tilt sensor.

8. The tilt sensor of claim 1, further comprising:
a first pin; and
a side portion forming a channel, the channel comprising a first plurality of ratchet slots, wherein the channel is configured to guide the first pin in a first path along the channel responsive to the pendulum pushing the first pin in a first direction along the channel, wherein the first plurality of ratchet slots are configured to prevent motion of the first pin in a second direction opposite the first direction, and wherein a position of the first pin retained by a ratchet slot of the first plurality of ratchet slots is indicative of a maximum tilt of the tilt sensor in the first direction.

9. The tilt sensor of claim 8, further comprising:
a second pin,
wherein the channel further comprises a second plurality of ratchet slots and is configured to guide the second pin in a second path along the channel responsive to the pendulum pushing the second pin in the second direction along the channel, wherein the second plurality of ratchet slots are configured to prevent motion of the second pin in the first direction, and wherein a position of the second pin retained by a ratchet slot of the second plurality of ratchet slots is indicative of a maximum tilt of the tilt sensor in the second direction.

10. The tilt sensor of claim 9, wherein at least one of the motion meter, the first pin or the second pin is resettable.

11. The tilt sensor of claim 1, wherein the tilt sensor is unpowered.

12. A tilt-sensing system comprising:
a housing forming an interior volume; and
a first tilt sensor disposed within the interior volume of the housing, wherein the first tilt sensor is configured to detect tilt in a first plane, the first tilt sensor comprising:
a rotational drive configured to translate rotational motion of an input shaft in a first rotational direction about a first axis of the input shaft and in a second rotational direction about the first axis of the input shaft into rotational movement in a first rotational direction about a second axis of an output shaft;
a pendulum coupled to the input shaft of the rotational drive, wherein the pendulum is configured to rotate the input shaft in the first rotational direction about the first axis of the second rotational direction about the first axis responsive to a tilt motion of the tilt-sensing system; and
a motion meter coupled to the output shaft of the rotational drive, wherein the motion meter is configured to display a measure of total tilt motion of the tilt-sensing system.

13. The tilt-sensing system of claim 12, wherein the rotational drive comprises:
a first one-way motion controller coupled to the input shaft; and
a first gear, wherein the first one-way motion controller is configured to drive the first gear in the first rotational direction about the first axis responsive to the tilt-sensing system tilting in a first direction and the input shaft rotating in the first rotational direction about the first axis.

14. The tilt-sensing system of claim 13, wherein the rotational drive further comprises:
a second one-way motion controller coupled to the input shaft;
a second gear, wherein the second one-way motion controller is configured to drive the second gear in the second rotational direction about the first axis responsive to the tilt-sensing system tilting in a second direction and the input shaft rotating in the second rotational direction about the first axis; and
a third gear, wherein the first gear and the second gear are configured to drive the third gear, wherein the third gear is coupled to the output shaft.

15. The tilt-sensing system of claim 12, wherein the motion meter comprises a mechanical counter configured to count one or more increments of rotational movement of the output shaft, wherein the one or more increments of rotational movement of the output shaft are indicative of a measure of total tilt motion of the tilt-sensing system.

16. The tilt-sensing system of claim 12, further comprising:
a first pin;
a second pin; and
a side portion forming a channel, the channel comprising:
a first plurality of ratchet slots, wherein the channel is configured to guide the first pin in a first path along the channel responsive to the pendulum pushing the first pin in a first direction along the channel, wherein the first plurality of ratchet slots are configured to prevent motion of the first pin in a second direction opposite the first direction, and wherein a position of the first pin retained by a ratchet slot of the first plurality of ratchet slots is indicative of a maximum tilt of the tilt-sensing system in the first direction; and
a second plurality of ratchet slots, wherein the channel is further configured to guide the second pin in a second path along the channel responsive to the pendulum pushing the second pin in the second direction along the channel, wherein the second plurality of ratchet slots are configured to prevent motion of the second pin in the first direction, and wherein a position of the second pin retained by a ratchet slot of the second plurality of ratchet slots is indicative of a maximum tilt of the tilt-sensing system in the second direction.

17. The tilt-sensing system of claim 16, wherein the housing comprises:
a top window; and
a side window, wherein the motion meter is viewable via the top window and the channel is viewable via the side window, and wherein the housing is configured to couple to one or more interior walls of a package at an interior corner of the package.

18. The tilt-sensing system of claim 12, further comprising:
a second tilt sensor disposed within the interior volume of the housing, wherein the second tilt sensor is configured to detect tilt in a second plane, and wherein the second plane is perpendicular to the first plane.

19. A package comprising:
a top wall;
a bottom wall;
one or more sidewalls, wherein the top wall, the bottom wall, and the one or more sidewalls enclose an interior volume; and a tilt sensor coupled to one or more of the top wall, the bottom wall, or the one or more sidewalls, the tilt sensor disposed within the interior volume, wherein the tilt sensor comprises:

a rotational drive configured to translate rotational motion of an input shaft in a first rotational direction about a first axis of the input shaft and in a second rotational direction about the first axis of the input shaft into rotational movement in a first rotational direction about a second axis of an output shaft;

a pendulum coupled to the input shaft of the rotational drive, wherein the pendulum is configured to rotate the input shaft in the first rotational direction about the first axis or the second rotational direction about the first axis responsive to a tilt motion of the package; and a motion meter coupled to the output shaft of the rotational drive, wherein the motion meter is configured to display a measure of total tilt motion of the package, and wherein the motion meter is viewable via a window of the package.

20. The package of claim 19, wherein the tilt sensor further comprises:

a first one-way motion controller coupled to an input shaft;

a second one-way motion controller coupled to the input shaft;

a first gear, wherein the first one-way motion controller is configured to drive the first gear in the first rotational direction about the first axis responsive to the package tilting in a first direction and the input shaft rotating in the first rotational direction about the first axis;

a second gear, wherein the second one-way motion controller is configured to drive the second gear in the second rotational direction about the first axis responsive to the package tilting in a second direction and the input shaft rotating in the second rotational direction about the first axis; and a third gear, wherein the first gear and the second gear are configured to drive the third gear, wherein the third gear is coupled to the output shaft.

21. A method comprising:

coupling a tilt sensor to at least one of a top wall of a package, a bottom wall of the package, or a sidewall of the package, the tilt sensor disposed within an interior of the package, wherein the tilt sensor is configured to display a measure of maximum tilt of the package and comprises a motion meter configured to measure a total tilt motion of the package; and preparing the package for shipment, wherein the tilt sensor is to measure maximum tilt and total tilt motion of the package during shipment.

22. A method comprising:

receiving a package that has been shipped, the package comprising a tilt sensor within a volume of the package, wherein the tilt sensor displays a measure of maximum tilt experienced by the package, and wherein a motion meter of the tilt sensor displays a measure of total tilt motion experienced by the package; and determining whether the package has been mishandled based on at least one of the measure of maximum tilt or the measure of total tilt.

23. The method of claim 22, further comprising:

performing a remedial action responsive to determining that the package has been mishandled.

24. The method of claim 22, further comprising:

resetting the tilt sensor to a default state for subsequent reuse.

* * * * *